J. WHITE.
Milk-Cooler.

No. 215,419.   Patented May 13, 1879.

WITNESSES:
Henry N. Miller
C. Sedgwick

INVENTOR:
J. White
BY Munn & Co
ATTORNEYS.

UNITED STATES PATENT OFFICE.

JOHN WHITE, OF LISBON, NEW YORK.

IMPROVEMENT IN MILK-COOLERS.

Specification forming part of Letters Patent No. 215,419, dated May 13, 1879; application filed January 21, 1879.

*To all whom it may concern:*

Be it known that I, JOHN WHITE, of Lisbon, in the county of St. Lawrence and State of New York, have invented a new and Improved Milk-Cooler, of which the following is a specification.

My invention relates to pans for holding milk, designed to cool the milk by a current of water and retain it at the proper temperature; and the invention consists in the combination of the hinged double leaves or covers having water-supply tubes with the vessel, the pan, and the tubes.

The invention is shown in the accompanying drawings.

Figure 1:
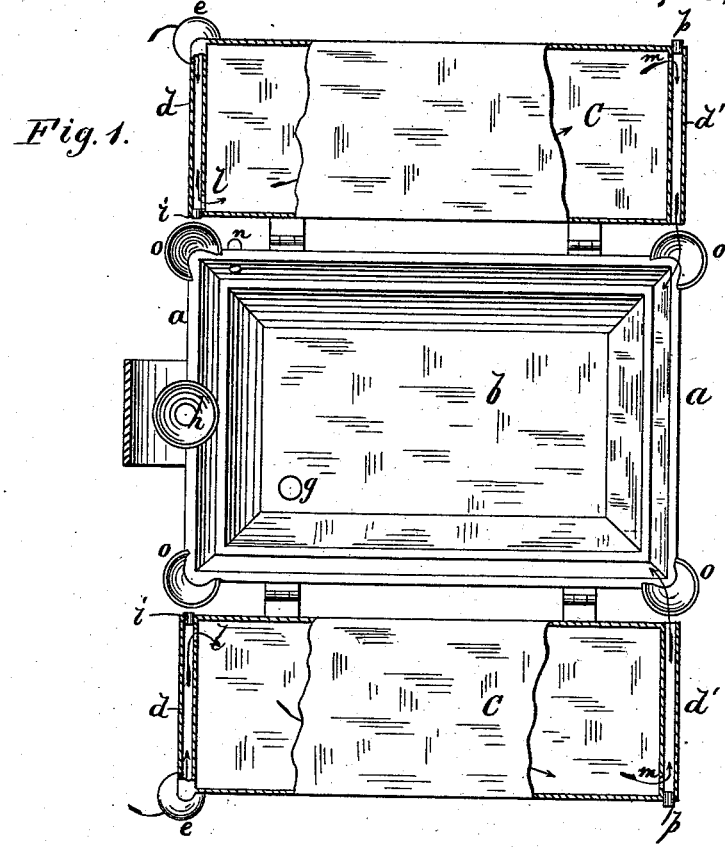
Figure 2:
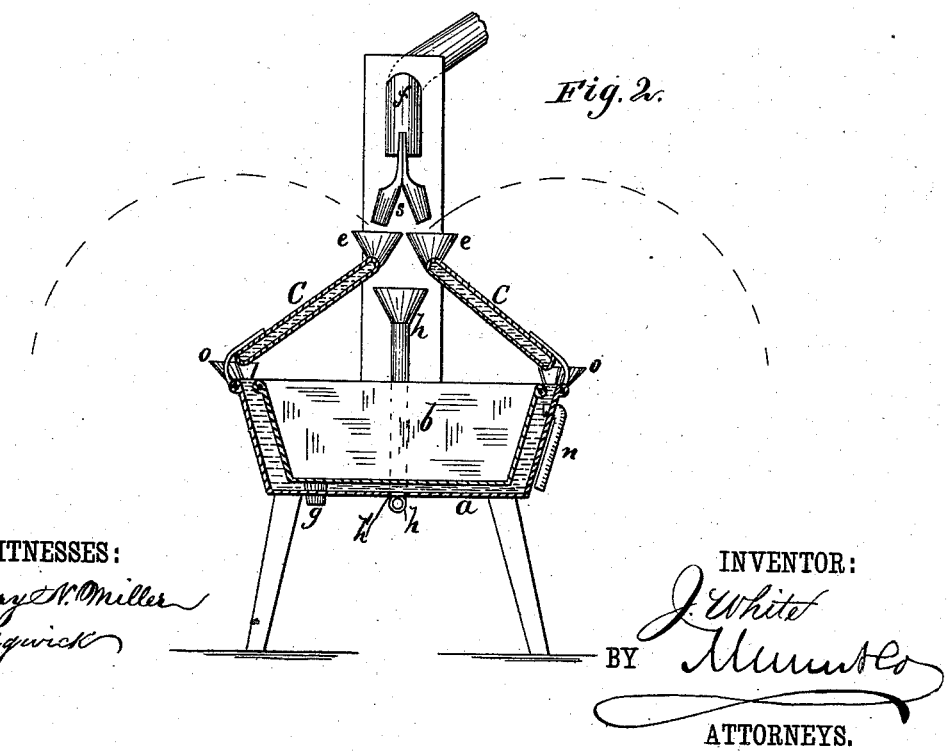

Figure 1 is a plan view with the covers of the pan spread open, and with parts of the covers and pipes broken away or in section. Fig. 2 is a cross-section with the covers closed.

Similar letters of reference indicate corresponding parts.

I make use of a vessel, $a$, that rests upon legs and contains an inner pan or receptacle, $b$, which is slightly smaller than $a$, and retained in place, so that there is a space between the two vessels, and the inner pan, $b$, is fitted so that it can be removed. The vessel $a$ and pan $b$ are preferably oblong in shape, and are of suitable depth.

$c\ c$ are folding leaves or covers hinged to the sides of vessel $a$, and fold over the pan $b$, so that when closed to their greatest extent they will stand at an angle of about forty-five degrees. These covers $c$ are made double, to form water-spaces, that communicate with pipes $d\ d'$, that are attached at the ends of covers $c$, the communication between the pipes $d\ d'$ and the water-spaces being as hereinafter described.

At one end of the apparatus the pipes $d$ terminate in funnels $e$, which when the covers are shut are beneath the double discharge-nozzle $s$ of the supply water-pipe $f$, so that the water will be discharged into both pipes $d$ at that end.

$g$ is a pipe for drawing off contents of pan $b$ through bottom of vessel $a$. This pipe is usually stopped.

$h$ is a pipe having a funnel to take water from pipe $f$ for filling the space around pan $b$ when the covers are not used, the water in this case entering $a$ by the opening $h'$ in the bottom; or the funnel of pipe $h$ may catch the drip from $f$ and discharge it at the end of $h$ beneath $a$, where there is a movable stopper.

The water runs from the supply-pipe $f$ into the tubes $d$ at that end of the apparatus, the lower end of the tubes $d$ being stopped by a stopper at $i$. The water passes between the double walls of covers $c$ by the opening $l$ and fills the space, then passes by opening $m$ to the tubes $d'$ at the other end, and down through those tubes to the water-space beneath and around pan $b$, the overflow from vessel $a$ passing out by pipe $n$.

At the corners of $a$, beneath tubes $d\ d'$, there are funnel-shaped projections $o$, to carry the water from $d\ d'$ down around pan $b$, and at $p$ the tubes $d'$ have stoppers to prevent overflow.

By this construction the milk-pan $a$ is in contact with water at the bottom and sides, and the air partly excluded from the top by the covers, that are kept cool by the water passing through them, thereby requiring much less water than was heretofore necessary.

The water of condensation that forms on the under side of the covers $c$ runs down into the spaces between the vessels $a\ b$.

The cooler described will carry the animal heat rapidly off from the milk and keep the milk at an even temperature.

Having thus fully described my invention, I claim as new and desire to secure by Letters Patent—

In a milk-cooler, the combination of the hinged double leaves or covers $c$, having pipes $d\ d'$, with the vessel $a$, pan $b$, and tubes $f\ s$, substantially as described and shown, and for the purposes set forth.

JOHN WHITE.

Witnesses:
WM. Z. WHITNEY,
JAMES C. WHITNEY.